(12) United States Patent
Terzian et al.

(10) Patent No.: US 7,266,396 B2
(45) Date of Patent: Sep. 4, 2007

(54) SELF POWERED CELL PHONE

(75) Inventors: Berj A. Terzian, Newbury, MA (US); Robert Alfred Brodmann, Weehawken, NJ (US)

(73) Assignee: Incelex, LLC., Newburry, MA (US)

( * ) Notice: Subject to any disclaimer, the term of this patent is extended or adjusted under 35 U.S.C. 154(b) by 200 days.

(21) Appl. No.: 11/120,255

(22) Filed: May 2, 2005

(65) Prior Publication Data

US 2006/0246962 A1 Nov. 2, 2006

(51) Int. Cl.
H04B 1/38 (2006.01)
H04M 1/00 (2006.01)

(52) U.S. Cl. .................... 455/573; 455/572; 455/343.1

(58) Field of Classification Search ................ 455/573, 455/572, 550.1, 575.1, 573.1
See application file for complete search history.

(56) References Cited

U.S. PATENT DOCUMENTS

| | | | |
|---|---|---|---|
| 3,204,110 A | 8/1965 | Yoshio | |
| 3,231,749 A | 1/1966 | Hinck III | |
| 4,260,901 A | 4/1981 | Woodbridge | |
| 4,423,334 A | 12/1983 | Jacobi et al. | |
| 4,821,218 A | 4/1989 | Potsch | |
| 5,271,328 A | 12/1993 | Boulais et al. | |
| 5,941,692 A | 8/1999 | Olney et al. | |
| 6,020,653 A | 2/2000 | Woodbridge et al. | |
| 6,172,426 B1 | 1/2001 | Galich | |
| 6,316,906 B1 * | 11/2001 | Lozada | 320/101 |
| 6,791,205 B2 | 9/2004 | Woodbridge | |
| 6,980,835 B2 * | 12/2005 | Hama | 455/567 |
| 7,031,743 B2 * | 4/2006 | Kawasaki et al. | 455/550.1 |
| 2003/0087677 A1 * | 5/2003 | Miller et al. | 455/572 |
| 2003/0232627 A1 * | 12/2003 | Tu et al. | 455/550.1 |
| 2004/0222637 A1 | 11/2004 | Bedyak | |
| 2004/0222638 A1 | 11/2004 | Bedyak | |

OTHER PUBLICATIONS

Wei Lik Leong, John Ngai, Adam Pike, "Human Power Harvesting", ECE 345, Senior Design Project No. 13, Spring 2004, May 4, 2004.*

* cited by examiner

Primary Examiner—Nick Corsaro
Assistant Examiner—Sylvia Mack
(74) Attorney, Agent, or Firm—Lucas & Mercanti, LLP

(57) ABSTRACT

A self powered cell phone is provided within which kinetically generated variable electrical currents are rectified to DC currents, which are delivered to an internal storage site and thereafter transmitted to the operating circuit of the cell phone, thus avoiding the need for external power sources to recharge the phone.

17 Claims, 1 Drawing Sheet

SELF POWERED CELL PHONE

BACKGROUND OF THE INVENTION

I. Field of the Invention

This invention relates to power supplies for cell phones and, more particularly, to a new system of generating power for such devices without having to rely upon an external charger or other independent power source.

II. Problems in the Prior Art

Cell phone usage is continuing to grow toward ubiquitous proportions around the globe. However, this expansion is limited by the power supplies that are currently used to operate such devices. Generally, cell phones contain rechargeable batteries which need to be periodically recharged with an AC adaptor or other external power source, so that their capability of use as portable communications devices can be restored and maintained.

This dependence on external power significantly limits opportunities for long term usage of cell phones in areas where there is no electrical power to perform the recharging process. This restriction is inconvenient and, more importantly, at times a serious problem in case of emergencies or other extraordinary situations where a call for help or other necessity cannot be made because a cell phone's internal power has been depleted. Thus, there is a definite need for modifying existing cell phones to render them always operable while free from dependence on external power.

SUMMARY OF THE INVENTION

The present Invention overcomes the foregoing problems by providing a new, self-contained power source for cell phones which comprises a kinetic electrical current generator coupled to other components that avoid the need for external power. Instead, the new power source almost continuously charges an internal battery by current generated from physical motion of the cell phone in any direction or orientation.

BRIEF DESCRIPTION OF THE DRAWINGS

Further details of the Invention will be readily understood by reference to the accompanying drawings and the following description, wherein.

DETAILED DESCRIPTION OF THE INVENTION

Figure 1:
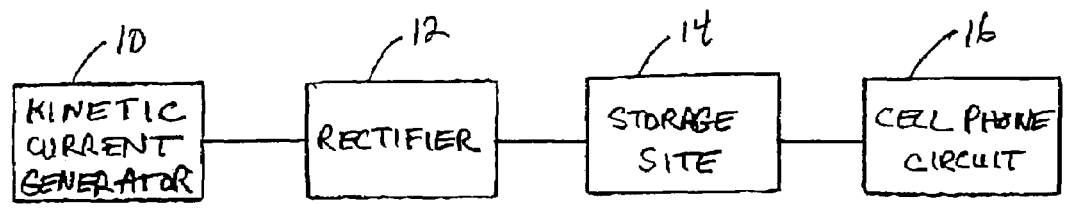
FIG. 1 is a block diagram of one embodiment of the Invention.

Referring to FIG. 1, block 10 represents a kinetic electrical generator that is included within the exterior casing of a cell phone and produces electrical currents when subjected to any motion of the phone. Block 12 represents a rectifier which converts variable electrical currents created by the generator into DC currents. Block 14 represents a storage site for receiving and storing the electrical energy of the DC currents. Block 16 represents the operating circuit of a conventional cell phone.

Figure 2:
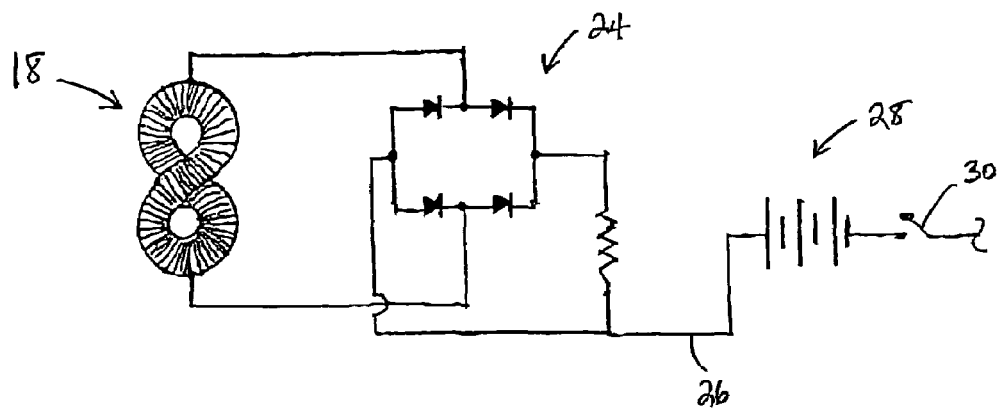
FIG. 2 is a drawing of specific circuit components for performing the embodiment of FIG. 1.
Figure 3:
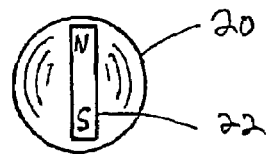
FIG. 3 is a view of a mobile component of the kinetic current generator depicted in FIG. 2.

Referring to FIG. 2, numeral 18 points to a specific form of a hollow raceway which works with a mobile magnetic ball 20, depicted in FIG. 3, to create variable electrical currents. In particular, raceway 18 is in the form of an endless loop twisted 180° around itself to provide a figure 8 shape which is wrapped with electrically conductive wire around its exterior. The cross section of the loop is circular. Ball 20 is formed with an internal permanent magnet 22 and with a diameter slightly less than the diameter of raceway 18 so that it can freely roll through the raceway.

As the ball 20 rolls through the raceway 18, electrical currents are electromagnetically created in the coil wrapped around its exterior. These currents will vary in magnitude, time duration and polarity depending on the speed, frequency, and direction of the rolling motions of ball 20. By shaping raceway 18 as a twisted loop, hills and valleys are developed within its interior such that the slightest physical motion, in any direction, of a cell phone containing it, will induce ball 20 to roll through the raceway to generate an electrical current. Therefore, current generation can or will occur very often during the course of a user's day, especially if the cell phone is carried on his or her person. Moreover, current generation can be carried out, at will, by manually moving the cell phone in any of myriad motions performed by the user.

As noted, the electrical currents created by a generator are variable in polarity. In order to obtain maximum recovery and storage of such currents, the output of generator 18 is connected to a full wave diode rectifier designated by numeral 24. The rectifier converts the variable polarities to a DC current which is delivered through lead 26 to a storage site, for example, a rechargeable lithium ion or nickel metal hydride battery. Thus, the electrical energy of the DC currents becomes stored and available for operation of the cell phone at all times without need for an external power source.

The output of battery 28 is delivered through switch 30 to the cell phone circuit. This switch may be designed to be operated by manual pushes on a power button or, in a folding type, partly pivotable phone, automatically by unfolding and folding it to initiate and terminate communications.

The invention has been described in terms of its operating principles and a specific illustrative embodiment. Many variations and modifications of the illustrative embodiment will be obvious to those skilled in the art. It will be understood that all such variations and modifications are intended to be covered by the ensuing claims and all equivalents thereof.

The following is claimed:

1. A self powered cell phone which comprises:
   a hollow tubular raceway configured as an endless loop which is twisted about itself to form a figure 8 shape that provides three dimensional hills and valleys within the raceway's interior;
   a coil of electrically conductive wire wrapped around the exterior of the raceway;
   a mobile ball disposed within the raceway and formed with an integral permanent magnet;
   the above elements being included in the cell phone and generating variable electrical currents when the cell phone is put into physical motion.

2. A cell phone according to claim 1 which further comprises means for rectifying the variable electrical currents into DC currents.

3. A cell phone according to claim 2 which further comprises means for receiving and storing the DC currents in a storage site.

4. A cell phone according to claim 3 which further comprises means for providing the stored DC currents to the operating circuit of the cell phone.

5. A cell phone according to claim 1 wherein the cross section of the loop is circular.

6. A cell phone according to claim 1 wherein physical motion of the cell phone in any direction generates an electrical current.

7. A cell phone according to claim 2 wherein the rectifier means comprises a full wave diode rectifier.

8. A cell phone according to claim 3 wherein the storage site comprises a rechargeable battery.

9. A cell phone according to claim 8 wherein the rechargeable battery comprises a lithium ion or nickel metal hydride battery.

10. A cell phone according to claim 3 which further comprises means for providing the stored DC currents to the operating circuit of the cell phone.

11. A cell phone according to claim 10 wherein the providing means comprises a switch that opens or closes a lead from the storage site to the operating circuit of the cell phone.

12. A cell phone according to claim 11 wherein the switch is operable by manual presses on a power button of the cell phone.

13. A cell phone according to claim 11 wherein the switch is operable by unfolding and folding pivotable parts of the cell phone.

14. A method of self powering a cell phone which comprises:
   forming a hollow tubular raceway configured as an endless loop which is twisted about itself in a figure 8 shape that provides three dimensional hills and valleys within the interior of the raceway;
   forming a coil of electrically conductive wire wrapped around the exterior of the raceway;
   providing a mobile ball within the raceway having an integral permanent magnet,
   the above elements being included in a cell phone; and
   physically moving the cell phone to self generate variable electrical currents in the wire coil as the mobile ball rolls through the raceway and its magnetic flux is intersected by the windings of the coil.

15. A method according to claim 14 which further comprises performing a full wave rectification of the variable electrical currents into DC currents.

16. A method according to claim 15 which further comprises storing the DC currents in a rechargeable battery.

17. A method according to claim 16 which further comprises storing the DC currents in a rechargeable lithium ion or nickel metal hydride battery.

* * * * *